United States Patent Office 2,937,969
Patented May 24, 1960

2,937,969

FLY REPELLENT

Willis N. Bruce, Champaign, Ill., assignor to
Lee Ratner, Chicago, Ill.

No Drawing. Filed Mar. 12, 1956, Ser. No. 570,696

14 Claims. (Cl. 167—22)

The present invention relates to new and improved fly repellents and fly repellent compositions and, while not strictly limited thereto, the invention is particularly concerned with safe and effective fly repellents and fly repellent compositions useful to farmers in the protection of their dairy cattle from biting as well as non-biting flies, such as house flies, horse flies, stable flies, horn flies, etc.

The hereinafter disclosed combination of repellent and fatty acid, pursuant to official requirement is being made the subject-matter of my divisional United States Letters Patent application Serial No. 3,279, filed January 19, 1960.

There can be little doubt concerning the benefits derived from good fly control practices in terms of increased milk and meat production. Prior workers in this art have endeavored for some time now to increase the fly control periods with a safe quantity of repellent in order to increase the benefits derived from good fly control. At present the commercially available cattle fly repellent sprays, when used at the recommended dosage of 2 ounces per animal, will give approximately 80 to 90% reduction in stable fly populations for a period of only ½ to 3 hours.

It is well known to entomologists that insects are quite specific in their response to repellents. As an example, mosquito repellents such as Rutgers 612 (2-ethyl-1,3-hexane diol), dimethyl phthalate, dimethyl carbate, Indolone (butyl ester of 3,4-dihydro 2,2-dimethyl-4 oxo-2H-pyran-6-carboxylic acid), etc., are of no practical value when applied to cattle in warding off the attack of biting flies. For this purpose other kinds of repellents were developed. Among these are Thanite (isobornyl-thiocyanoacetate), Crag fly repellent (butoxy polypropylene glycol), Lethane 384, (beta-butoxy-beta-thiocyanodiethyl ether) and the activated pyrethrin sprays. None of these can safely be used in quantities to effect a high order of fly control (90% repellency) for periods of more than a few hours. There also are serious implications of contamination of the milk when large quantities of these materials are used, as well as injury to the animal itself. Therefore, practical limits in dosage of active ingredients per animal must not be exceeded to produce beneficial results. Concentrate sprays can be applied safely to cattle if the quantity is limited to a few ml. per animal. All of these factors must be borne in mind when considering the present invention.

It is an object of the invention to produce and provide fly repellents and fly repellent compositions which will give cattle a high level of protection from flies, not for just 2 or 3 hours, but throughout the day.

A further object of the invention is to provide fly repellents and fly repellent compositions which are safe, highly effective for long periods of time and which greatly enhance methods of control widely used by farmers to protect their dairy cattle from biting and non-biting flies.

It has now been found, in accordance with the present invention, that the lower alkyl esters, such as the n-propyl and n-butyl esters, of dicarboxylic acids, such as maleic, fumaric and succinic acids, afford safe, highly effective and long lasting fly repellency action for the purposes herein indicated, either when employed per se or in solutions or aqueous emulsions. Typical specific esters falling within the foregoing genus are di-n-propyl maleate, di-n-butyl maleate, di-n-propyl succinate, di-n-butyl succinate, di-n-propyl fumarate and di-n-butyl fumarate.

It is thought that safe repellents are those which if absorbed by the animal tissue would be readily metabolized into useable organic compounds. Since dicarboxylic acids seemed to be the most promising source of fly repellent esters, the desired intermediate metabolites (fumaric and succinic acids) were found in the Krebs cycle. For example, the butyl alcohol residue of the butyl esters when released within the body should readily oxidize to butyric acid and then decarboxylate to carbon dioxide and water. Thus constituted, di-n-butyl-succinate or di-n-butylfumarate, as well as the other esters, could safely be used in dilute or concentrated solutions upon animals, or as emulsifiable concentrates which are diluted with water or saturating spraying of animals. Acute toxicity tests with these esters indicate that they are innocuous.

It has been found, in accordance with the invention, that certain synergists when used in combination with the aforesaid alkyl esters of dicarboxylic acids, will render said esters much more effective. This is a very surprising discovery because the synergists employed to increase the effectiveness of the esters are in and of themselves absolutely ineffective to repel flies. The synergists employed are piperonyl butoxide (3:4-methylene dioxy-6-propylbenzyl n-butyl diethyleneglycol ether), sulfoxide (n-octyl sulfoxide of isosafrole), M.G.K. 264 (N-2-ethyl hexyl imide of endomethylene tetrahydrophthalic acid), Crag fly repellent (butoxy polypropylene glycol) and various unsaturated fatty acids and fatty acid esters. The discovery that these various fatty acids and fatty acid esters are synergists for the ester fly repellent of the present invention was even more surprising because these fatty materials not only do not repel flies but they are actually used in fly baits to attract flies.

In order to test or evaluate the effectiveness of the fly repellent esters of the present invention, as well as to test and evaluate the effectiveness of said repellents in combination with synergists, both laboratory and field repellency tests were carried out. First, with respect to laboratory tests, the following procedure was followed:

Weighed lactose pellets, used as bait, were placed upon filter paper which was impregnated with the test solution. The filter paper was folded, to form a slightly conical surface which prevented the pellet from being moved by the flies. The actual procedure was as follows: The solution of the repellent in acetone was applied to the folded 5.5 cm. filter paper by means of a micropipette. In the case of the ester repellent, sufficient solution was used to leave 5 mg. of the repellent on the paper. When a combination of ester and synergist was tested, sufficient solution was employed to leave 5 mg. each of repellent and synergist on the paper. The weighed pellet was placed in the center of the paper after the solution had diffused evenly throughout the paper. Usually 20 to 30 minutes aging in a moist chamber (100% humidity) of 85° F. were required for even distribution of the liquid. The filter paper with the pellet was then placed upon a turn table in an exposure cage. The turn table, powered by a 4 r.p.m. timer motor, was in operation during all exposure periods. The pellet could be removed from the filter paper at any desired period after treatment or pellets could be placed on the filter paper for hourly period after treatment. It was possible to obtain the over-all 24-hour repellency of a solution by allowing the pellet to remain in the cage for 24 hours before removal. Tests were conducted at a constant temperature of 80° F. and a relative humidity of 100%. As standard procedure, about 150 adult flies were used for each filter paper to be tested. Usually ten to twenty papers and pellets were exposed simultaneously. All pellets removed from test papers were dried in an oven (60° C.) for 24 hours and then reweighed. The amount of lactose lost by feeding indicated the relative repellency of the materials used, since the fly had to contact the treated filter paper during feeding.

Two sizes of lactose pellets were used—a small 35–37 mg. pellet for short exposures, and a larger 78–80 mg. pellet for 8 to 24 hours or more of continuous exposure. Constant illumination was provided by a 100-watt light bulb suspended approximately 12 inches above the turn table cage. A 50 ml. beaker containing a folded paper wick and water was placed in the center of the turn table to supply the flies with needed water.

The weight loss data obtained may be analyzed statistically or may be transformed into percent repellency by the following formula:

$$\text{Percent repellency} = \frac{\text{Original wt. of pellet mg.} - \text{mg. consumed by flies} \times 100}{\text{Original wt. of pellet mg.}}$$

Laboratory repellency tests carried out in accordance with the foregoing procedure gave the following results for the indicated repellent or repellent composition:

| Repellent | Percentage Repellency After— | | | | |
|---|---|---|---|---|---|
| | 30 min. | 600 min. | 1,200 min. | 3,000 min. | 4,500 min. |
| di-n-propylmaleate | 100 | F | 00.0 | 00.0 | 00.0 |
| di-n-propylmaleate+piperonyl butoxide | 100 | F | 23.2 | 00.0 | 00.0 |
| di-n-butylmaleate | 100 | 100 | 71.0 | 29.4 | 00.0 |
| di-n-butylmaleate+piperonyl butoxide | 100 | 100 | 100 | 97.6 | 90.2 |
| di-n-butylsuccinate | 100 | 100 | 92.1 | 69.3 | 27.4 |
| di-n-butylsuccinate+piperonyl butoxide | 100 | 100 | 100 | 98.2 | 94.3 |
| di-n-propylsuccinate | 100 | F | 6.8 | 00.0 | 00.0 |
| di-n-propylsuccinate+piperonyl butoxide | 100 | 100 | 89.6 | 47.8 | 15.4 |
| di-n-propylfumarate | 100 | 100 | 90.1 | 71.2 | 21.0 |
| di-n-propylfumarate+piperonyl butoxide | 100 | 100 | 100 | 100 | 95.3 |
| di-n-butylfumarate | 100 | 100 | 93.2 | 59.7 | 36.3 |
| di-n-butylfumarate+piperonyl butoxide | 100 | 100 | 100 | 98.5 | 92.2 |
| di-n-butylsuccinate+sulfoxide | 100 | 100 | 100 | 96.6 | 90.2 |
| di-n-butylsuccinate+M.G.K.–264 (N-(2-ethylhexyl)bicyclo(2,2,1)-5-heptene-2,3-dicarboximide) | 100 | 100 | 100 | 95.2 | 89.0 |
| di-n-propylfumarate+sulfoxide | 100 | 100 | 100 | 100 | 97.8 |
| di-n-propylfumarate+M.G.K.–264 | 100 | 100 | 100 | 98.3 | 91.2 |
| di-n-butylfumarate+sulfoxide | 100 | 100 | 100 | 100 | 94.8 |
| di-n-butylfumarate+M.G.K.–264 | 100 | 100 | 100 | 96.0 | 93.7 |
| di-n-butylmaleate+sulfoxide | 100 | 100 | 100 | 95.8 | 90.1 |
| di-n-butylmaleate+M.G.K.–264 | 100 | 100 | 100 | 90.6 | 83.5 |
| di-n-propylmaleate+sulfoxide | 100 | F | 25.2 | 00.0 | 00.0 |
| piperonyl butoxide | F 00.0 | 00.0 | 0 | 0 | 0 |
| M.G.K.–264 | F 00.0 | 0.0 | 0 | 0 | 0 |
| Sulfoxide | F 00.0 | 00.0 | 0 | 0 | 0 |
| Rutger's 612 | F | 00.0 | 0 | 0 | 0 |
| Rutger's 612=piperonyl butoxide | F | 00.0 | 0 | 0 | 0 |
| dimethyl carbate | F | 00.0 | 0 | 0 | 0 |
| Thanite | 95.6 | 83.7 | 64.0 | 23.0 | 00.0 |
| di-n-butyl-succinate+Thanite | 100 | 100 | 90.2 | 82.6 | 28.7 |
| di-n-butylsuccinate+oleic acid | 100 | 100 | 100 | 96.1 | 87.3 |
| di-n-butylsuccinate+lard oil (Armo extra winter strained) | 100 | 100 | 97.4 | 90.2 | 80.8 |
| di-n-butylsuccinate+propyl oleate | 100 | 100 | 99.2 | 91.4 | 77.2 |
| di-n-butylsuccinate+benzyl oleate | 100 | 100 | 100 | 95.5 | 85.9 |
| di-n-butylsuccinate+Crag Fly Repellent | 100 | 100 | 100 | 98.0 | 88.9 |
| di-n-butylsuccinate+stearic acid | 100 | 100 | 87.2 | 61.0 | |
| di-n-butylsuccinate+Petrolatum (USP ALPA) | 100 | 93.2 | 65.7 | 42.5 | |
| Oleic acid | 0.0 | (1) | (1) | (1) | (1) |
| Lard Oil | 0.0 | (1) | (1) | (1) | (1) |
| Saturated fatty acids and hydrocarbons | 0.0 | 0.0 | | | |

[1] Is attractive rather than repellent.

Laboratory tests were also carried out to determine the optimum ratio of ester repellent to synergist. A total of 10 mg. repellent and/or synergist was added to each 5.5 cm. filter paper and aged at 80° F. and 100% relative humidity for 20 hours. The results of these tests are tabulated hereinbelow:

| Repellent, di-n-butyl-succinate, mg. | Synergist, sulfoxide, mg. | Ave. Percent Repellency for three groups |
|---|---|---|
| 10 | 0 | 92.8 |
| 8 | 2 | 96.1 |
| 6 | 4 | 98.3 |
| 5 | 5 | 100.0 |
| 4 | 6 | 93.3 |
| 2 | 8 | 44.5 |
| 0 | 10 | 6.5 |

| di-n-butyl-fumarate, mg. | sulfoxide, mg. | Percent Repellency |
|---|---|---|
| 10 | 0 | 93.4 |
| 8 | 2 | 97.6 |
| 6 | 4 | 99.0 |
| 5 | 5 | 100.0 |
| 4 | 6 | 95.5 |
| 2 | 8 | 38.2 |
| 0 | 10 | 7.1 |

| di-n-butyl-succinate mg. | piperonyl butoxide, mg. | Percent Repellency |
|---|---|---|
| 10 | 0 | 90.5 |
| 8 | 2 | 94.2 |
| 6 | 4 | 96.5 |
| 5 | 5 | 98.9 |
| 4 | 6 | 90.3 |
| 2 | 8 | 29.2 |
| 0 | 10 | 4.2 |

| di-n-butyl-succinate, mg. | oleic acid, mg. | Percent Repellency |
|---|---|---|
| 10 | 0 | 91.9 |
| 8 | 2 | 95.3 |
| 6 | 4 | 99.2 |
| 5 | 5 | 99.6 |
| 4 | 6 | 88.4 |
| 2 | 8 | 15.3 |
| 0 | 10 | 0.0 |

It will be seen from the foregoing table that, when ester repellent-synergist combinations are employed, best results are obtained when the synergist comprises 20 to 60% of the combination.

In the field test, a 7 x 7 latin square of three animal blocks was employed to test the reliability of data obtained in the fields and to determine the relative merits of various cattle sprays in repelling horn and stable flies.

To initiate this experiment it was necessary to predetermine the relative susceptibility of all the animals in the herd. This was accomplished by recording the number of flies on each animal at 10 a.m., 1 p.m., and 3 p.m. for three days. The animals were then grouped according to their relative attractiveness to horn and stable flies. Three three-cow groups thus balanced for uniformity in fly attractivity were selected for testing.

The animals were treated with approximately 2 oz. of spray per animal, applied by means of an atomizing sprayer, at 6 a.m. on days when the temperature was expected to exceed 87° F. When an ester repellent was tested a 2% solution in a cattle spray base oil was employed, and when the ester-synergist combination was employed, a cattle spray base-oil containing 2% ester and 5% synergist was employed. In some instances these concentrations were varied. Three groups of three cows were tested for each material. The cattle spray base oil employed was a mineral oil fraction having a density of 0.8251, Saybolt viscosity of 36–41, distillation range of 510–600° F. and a flash point of 250° F. A record was made of the number of stable and horn flies found on each animal two, eight, twelve, twenty-four and seventy-two hours after spraying.

As a result of the field tests, the following results were obtained:

| Repellent used | Percent Reduction of Stable Flies After— | | | | |
|---|---|---|---|---|---|
| | 2 hrs. | 8 hrs. | 12 hrs. | 24 hrs. | 72 hrs. |
| 2% di-n-butylsuccinate | 96.5 | 84.6 | 74.3 | 43.7 | |
| 2% di-n-butylsuccinate with 5% sulfoxide | 98.4 | 95.5 | 90.4 | 87.3 | 62.3 |
| 2% di-n-butylfumarate | 97.8 | 87.3 | 77.7 | 45.6 | |
| 2% di-n-butylfumarate with 5% sulfoxide | 98.7 | 98.2 | 95.5 | 90.2 | 67.2 |
| 2% di-n-propylfumarate | 99.0 | 90.3 | 58.4 | 31.2 | |
| 2% di-n-propylfumarate with 5% sulfoxide | 100 | 98.2 | 96.2 | 86.3 | 41.2 |
| 2% di-n-butylmaleate | 96.2 | 84.9 | 66.5 | 38.7 | |
| 2% di-n-butylmaleate with 5% sulfoxide | 98.2 | 95.3 | 89.9 | 85.2 | 52.3 |
| 3% Thanite | 82.3 | 64.1 | 46.6 | 2.1 | 0.5 |
| 0.1% pyrethrins, 1.0% sulfoxide, 5% Crag fly repellent | 84.2 | 78.0 | 77.2 | 53.0 | 2.3 |
| 5% di-n-butylfumarate | 97.2 | 95.2 | 93.2 | 85.2 | 21.3 |
| 5% di-n-butylsuccinate | 96.0 | 93.2 | 91.0 | 81.4 | 13.7 |
| 1.0% pyrethrins with 10% sulfoxide | 92.6 | 89.6 | 86.7 | 63.4 | 12.2 |
| 30% Crag fly repellent | 81.4 | 77.2 | 73.2 | 33.4 | 10.0 |
| 2% di-n-butylfumarate with 5% piperonyl butoxide | 99.3 | 97.7 | 92.9 | 89.2 | 67.5 |
| 2% di-n-butylsuccinate with 5% piperonyl butoxide | 97.4 | 96.3 | 89.4 | 85.5 | 60.0 |
| 5% sulfoxide | 23.3 | 10.3 | 6.7 | 0.2 | 0.0 |
| 5% piperonyl butoxide | 18.6 | 12.3 | 6.2 | 1.1 | 0.2 |
| 2% di-n-butylsuccinate with 2% malathion (O,O-dimethyl dithiophosphate of diethylmercaptosuccinate) | 98.4 | 96.5 | 91.8 | 83.4 | 55.6 |
| 2% malathion alone | 12.2 | 0.4 | 1.3 | 2.3 | 0.6 |

In order further to evaluate the addition of oleic acid, as well as other unsaturated fatty acids, to the repellents of the present invention, and also to ascertain the desirability of the addition of other additives, another series of laboratory tests was conducted in a manner heretofore set forth. In the tests, 10 mg. di-n-butyl succinate were used with each additive. Percent repellency of various mixtures of repellent and additive was determined by applying the mixture to 5.5 cm. filter papers and exposing the treated papers to flies. The following results were observed:

| Additive | Percent Repellency 48 hrs. after treatment |
|---|---|
| None | 00.0 |
| 2.5 mg. oleic acid | 22.3 |
| 5 mg. oleic acid | 48.7 |
| 10 mg. oleic acid | 97.8 |
| 20 mg. oleic acid | 100.0 |
| 30 mg. oleic acid | 100.0 |
| 60 mg. oleic acid | 100.0 |
| 10 mg. Atlox 1045 A (polyoxyethylene sorbitol esters of mixed oleic and lauric acids) | 52.1 |

| Additive | Percent Repellency 48 hrs. after treatment |
|---|---|
| 10 mg. Span 85 (sorbitan trioleate) | 84.0 |
| 10 mg. Span 80 (sorbitan mono-oleate) | 88.8 |
| 10 mg. Atlox 3335 (polyoxyethlene sorbitan esters of mixed fatty and resin acids) | 38.2 |
| 10 mg. Triton X100 (alkyl arylpolyether alcohol) | 57.2 |
| 10 mg. B-1956 (emulsifier containing 77% modified phthalic glycerol alkyd resin in ethylene dichloride) | 77.4 |
| 10 mg. Rutgers 612 | 9.8 |
| 10 mg. Dimethylphthalate | 14.2 |
| 30 mg. olive oil | 50.0 |
| 30 mg. corn oil | 12.7 |
| 30 mg. H-C resin (hydrocarbon synthetic resin) | 4.2 |
| 30 mg. palmitic acid | 13.3 |
| 30 mg. lauric acid | 3.0 |
| 30 mg. stearic acid | 00.0 |
| 30 mg. paraffin | 10.0 |
| 30 mg. caprylic acid | 8.2 |
| 30 mg. linoleic acid | 85.3 |
| 30 mg. ricinoleic | 68.2 |

The foregoing results show that additions of various amounts of oleic acid increase the repellency of the di-n-butylsuccinate. Unsaturated fatty acids increase the repellency remarkably, whereas saturated fatty acids increase repellency only slightly. The various surface-active materials (Atlox 1045 A, etc.) increase repellency while mosquito repellents (Rutgers 612 and di-methylphthalate) do not significantly increase repellency.

As previously indicated, the repellents of the present invention may be applied per se to animals but in most cases it it desirable to employ the repellents with a carrier or vehicle, i.e., either in oil solutions or in emulsifiable concentrates. Actually, the amount of repellent or repellent mixture in the carrier or vehicle may be varied over extremely wide limits but it is recommended that not less than 2% repellent be included in any repellent-vehicle mixture. When oil solutions are employed, a 2% to 5% repellent-in-oil solution is used on animals at a rate of 2 oz. per head for 24–72 hours of protection. Synergists and additives may be used in concentrations of 2% to 10% to extend repellency beyond 72 hours. For 2 to 7 days protection, 5% to 20% repellent-in-oil solutions are employed and 5% to 95% synergists and additions may also be employed. Emulsion concentrates may be made up of 20% to 90% repellent with 10% emulsifier such as Atlox 1045-A, the remainder comprising an additive or synergist, the amount of emulsifier being variable according to the stability of emulsion devised.

In formulating repellent-in-oil solutions, mineral oil fractions are desirable as carriers of diluents. The following diluents have been satisfactorily employed:

| Code No. | Oil | Mol. Wt. | Composition | | | | | | Percent U.R. |
|---|---|---|---|---|---|---|---|---|---|
| | | | Microdye Analysis | | | NDM Method | | | |
| | | | Percent PN | Percent O | Percent A | Percent P | Percent N | Percent A | |
| L-2687 | No. 9 | 198±5 | 96 | Trace | 4 | 73 | 27 | 0 | 96.6 |
| L-1543 | Min. Seal | 245±10 | 87 | 0 | 13 | 62 | 31 | 7 | 93.8 |
| L-8715 | N-Octadecane | 254.4 | 100 | 0 | 0 | 100 | 0 | 0 | 100.0 |
| L-6942 | Eureka | 288±5 | 100 | 0 | 0 | 66 | 34 | 0 | 100.0 |
| L-53 | Acme | 324±10 | 92 | 0 | 8 | 64 | 34 | 2 | 97.6 |
| L-111 | Premier | 330±5 | 98 | 0 | 2 | 64 | 36 | 0 | 100.0 |
| L-8382 | Superla No. 10 | 352 | 97 | 0 | 3 | 65 | 35 | 0 | 100.0 |

| Code No. | Viscosity, SSV at 100° F. | Ave. Carbon | Aniline Pt. (° C.) | Gravity (° API) | Sp. Gr. at 20° C. | 50% Dist. Pt. (° F.) | Ref. Index (20° C.) | Sp. Dispersion |
|---|---|---|---|---|---|---|---|---|
| L-2687 | | 13 | 72.7 | 45.8 | .7850 | 420 | 1.4410 | 103.2 |
| L-1543 | 42.5 | 18 | 83.5 | 37.4 | .8345 | 570 | 1.4632 | 106.6 |
| L-8715 | | | | | | | | |
| L-6942 | 54.2 | 20 | 98.8 | 37.2 | .8355 | 629 | 1.4612 | 98.6 |
| L-53 | 79.4 | 22 | 98.2 | 33.9 | .8528 | 685 | 1.4702 | 105.4 |
| L-111 | 75.7 | 22 | 102.5 | 35.1 | .8460 | 681 | 1.4640 | 98.3 |
| L-8382 | 93.1 | 22 | 106.0 | 34.3 | .8507 | 694 | 1.4679 | 99.7 |

Tests were carried out to determine the optimum ratio of repellent to oil solvent. In the tests, oil solvent No. L-6942, identified in the above table, was employed with 10 mg. of di-n-butylsuccinate. Various amounts of oil were used, with the repellent, on 5.5 cm. filter paper and tested 72 hours after treatment. The following results were observed:

| Mg. of oil per 5.5 cm. paper: | Percent repellency |
|---|---|
| 0 | 0.0 |
| 2.5 | 6.5 |
| 5 | 57.4 |
| 10 | 98.1 |
| 15 | 100.0 |
| 20 | 100.0 |
| 25 | 87.4 |
| 30 | 77.6 |
| 40 | 64.2 |
| 50 | 57.7 |
| 100 | 26.0 |
| 200 | 18.4 |
| 400 | 11.7 |

The foregoing results illustrate that oils such as L-6942 are advantageous when added to the repellents in any desirable ratio.

Tests were also carried out to determine the optimum performance of di-n-butylsuccinate (BS) and di-butylfumarate (BF) with oil diluents of various molecular weights. In each case, 10 mg. of repellent was used with 20 mg. of oil on each 5.5 cm. filter paper. The following results were observed:

| Oil Code No. | Average Gram Molecular wt. of oil | Repellent | Percent Repellency of 5.5 cm. filter papers 48 hrs. after treatment with oils containing repellents |
|---|---|---|---|
| L-2687 | 198 | BS | 17.2 |
| L-1543 | 245 | BS | 38.4 |
| L-8715 | 254 | BS | 52.7 |
| L-111 | 330 | BS | 69.4 |
| L-8382 | 349 | BS | 75.5 |
| L-53 | 324 | BS | 87.4 |
| L-6942 | 288 | BS | 100.0 |
| Acetone | | BS | 8.0 |
| L-2687 | 198 | BF | 24.1 |
| L-1543 | 245 | BF | 42.6 |
| L-8715 | 254 | BF | 57.8 |
| L-111 | 330 | BF | 73.4 |
| L-8382 | 349 | BF | 79.8 |
| L-53 | 324 | BF | 96.4 |
| L-6942 | 288 | BF | 100.0 |
| Acetone | | BF | 12.7 |

From the foregoing it will be seen that oils of various molecular weights increase the repellency of surfaces treated with the mixtures. Optimum repellency was obtained with oils of intermediate molecular weights (254-349).

In addition to the specific formulation employed above in the field tests, the following are given by way of further examples:

*Oil solution for daily application*

| | Percent |
|---|---|
| Di-n-butylsuccinate | 2 |
| Oleic acid | 5 |
| Cattle spray base oil | 92.5 |
| Methoxychlor | 0.5 |

*Oil solution for weekly application*

| | Percent |
|---|---|
| Di-n-butylsuccinate | 20 |
| Oleic acid | 50 |
| Cattle spray base oil | 29 |
| Methoxychlor | 1 |

*Emulsifiable concentrate for dilution with water*

| | Percent |
|---|---|
| Atlox 1045A | 10 |
| Di-n-butylsuccinate | 32 |
| Oleic acid | 53 |
| Methoxychlor | 5 |

It will be readily understood, of course, that in any of the foregoing formulations, the di-n-butylsuccinate may be substituted by di-n-propylmaleate, di-n-butylmaleate, di-n-propylsuccinate, di-n-propylfumarate or di-n-butylfumarate and the oleic acid may be replaced by piperonyl butoxide, n-octyl sulfoxide of iso-safrale, N-2-ethyl hexylimide of endomethylene tetrahydrophthalic acid, butoxypolypropyleneglycol, lard oil, propyl oleate, benzyl oleate, and stearic acid.

While it has been indicated herein that the repellents and repellent mixtures of the present invention have utility in the treatment of cattle so that the cattle will yield more butter fat during the fly season than they would if they were not protected, it will be readily understood, of course, that the repellent and repellent mixtures may be and are used in other environments. For instances, the repellents herein disclosed are effective to repel flies from hogs and horses. Moreover, the repellents may be combined with other repellents, such as Rutgers 612, etc., and applied to humans. Thus, the repellents of the invention possess utility in repelling flies not only from cattle, but from other animals as well, and also from humans.

It will also be understood that the present repellents may be mixed with known insecticides, such as DDT, etc., so that as the repellent loses its potency and repellent power, the insecticides will serve to kill those flies not repelled.

What is claimed is:

1. A composition comprising di-n-butyl maleate and (3:4-methylene dioxy-6-propylbenzyl n-butyl diethyleneglycol ether).

2. A composition comprising di-n-butyl succinate and (3:4-methylene dioxy-6-propylbenzyl n-butyl diethyleneglycol ether).

3. A composition comprising di-n-propyl succinate and (3:4-methylene dioxy-6-propylbenzyl n-butyl diethyleneglycol ether).

4. A composition comprising di-n-propylfumarate and n-octyl sulfoxide of isosafrole.

5. A composition comprising di-n-butylfumarate and n-2-ethyl hexyl imide of endomethylene tetrahydrophthalic acid.

6. A process for repelling flies from warm-blooded animals which comprises applying to said animal a repellent composition comprising di-n-butyl maleate and (3:4-methylene dioxy-6-propylbenzyl n-butyl diethyleneglycol ether).

7. A process for repelling flies from warm-blooded animals which comprises applying to said animal a repellent composition comprising di-n-butyl succinate and (3:4-methylene dioxy-6-propylbenzyl n-butyl diethyleneglycol ether).

8. A process for repelling flies from warm-blooded animals which comprises applying to said animal a repellent composition comprising di-n-propyl succinate and (3:4-methylene dioxy-6-propylbenzyl n-butyl diethyleneglycol ether).

9. A process for repelling flies from warm-blooded animals which comprises applying to said animal a repellent composition comprising di-n-propylfumarate and n-octyl sulfoxide of isosafrole.

10. A process for repelling flies from warm-blooded animals which comprises applying to said animals a repellent composition comprising di-n-butylfumarate and n-2-ethyl hexyl imide of endomethylene tetrahydrophthalic acid.

11. A composition for repelling insects comprising, as a repellent, a symmetrical diester of a 4-carbon atom dicarboxylic acid esterified with alkyl radicals selected from the group consisting of n-propyl and n-butyl and, as a synergist, a hetero-dicyclic compound selected from the group consisting of 3:4-methylene dioxy-6-propylbenzyl-n-butyl diethyleneglycol ether, n-octyl sulfoxide of isosafrole, and n-2-ethyl hexyl imide of endomethylene tetrahydrophthalic acid.

12. A composition for repelling insects comprising, as a repellent, a symmetrical diester of a 4-carbon atom dicarboxylic acid esterified with alkyl radicals selected from the group consisting of n-propyl and n-butyl and, as a synergist 3:4-methylene dioxy-6-propylbenzyl-n-butyl diethyleneglycol ether.

13. A process for repelling flies from warm-blooded animals which comprises applying to said animals a symmetrical diester of a 4-carbon atom dicarboxylic acid esterified with alkyl radicals selected from the group consisting of n-propyl and n-butyl and, as a synergist, a hetero-dicyclic compound selected from the group consisting of 3:4-methylene dioxy-6-propylbenzyl-n-butyl diethyleneglycol ether, n-octyl sulfoxide of isosafrole, and n-2-ethyl hexyl imide of endomethylene tetrahydrophthalic acid.

14. A process for repelling flies from warm-blooded animals which comprises applying to said animals a symmetrical diester of a 4-carbon atom dicarboxylic acid esterified with alkyl radicals selected from the group consisting of n-propyl and n-butyl and, as a synergist 3:4-methylene dioxy-6-propylbenzyl-n-butyl diethyleneglycol ether.

References Cited in the file of this patent

UNITED STATES PATENTS

| 1,727,305 | Moore | Sept. 3, 1929 |
|---|---|---|
| 2,274,267 | Grawett | Feb. 24, 1942 |
| 2,757,120 | Leonard | July 31, 1956 |

OTHER REFERENCES

Eddy: Soap and Sanitary Chem., vol. 30, July 1954, p. 121.

Smith and Cole et al.: J. Econ. Entomol., vol. 47, February 1954, pp. 13–15 (p. 15 code No. 671, 6052 relied on).

Smith and Burnett: J. Econ. Entomol., vol. 42, June 1949, pp. 439–440.

Organic Chem., Coll. Outline series, Barnes and Noble, 1951, p. 73.

King: U.S. Dept. Agr. Handbook No. 69, May 1954, pp. 1–21, 176, 220, 316.

Soap and Sanitary Chem., March 1952, vol. 28, No. 3, pp. 136–137.

Drug and Cos. Ind., January 1947, vol. 66, No. 1, pp. 44–47.

Frear: Chem. of Insecticide, Fungicides and Herbicides, D. Van Nostrand, 2nd ed., 1948, pp. 280–287.

Lindquist: J. Eco. Ent., vol. 37, No. 4, August 1944, pp. 485–486.

Linduska: J. Eco. Ent., vol. 39, No. 6, December 1946, pp. 767–769.

Pest Control Materials (1950), Frear and Hilborn, p. 22.

King: U.S. Dept. Agr. Handbook No. 69, pp. 218, 219, 248.